(12) United States Patent
Sankaranarayanan et al.

(10) Patent No.: US 10,732,859 B2
(45) Date of Patent: Aug. 4, 2020

(54) SYSTEMS AND METHODS FOR GRANULAR NON-VOLATILE MEMORY HEALTH VISIBILITY TO A HOST

(71) Applicant: Dell Products L.P., Round Rock, TX (US)

(72) Inventors: Vadhiraj Sankaranarayanan, Austin, TX (US); Krishna Pradyumna Kakarla, Round Rock, TX (US); Balaji Bapu Gururaja Rao, Austin, TX (US); Elie Antoun Jreij, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 15/727,207

(22) Filed: Oct. 6, 2017

(65) Prior Publication Data
US 2019/0107960 A1 Apr. 11, 2019

(51) Int. Cl.
*G06F 3/06* (2006.01)
*G06F 12/10* (2016.01)
*G06F 12/02* (2006.01)
*G06F 11/00* (2006.01)
(Continued)

(52) U.S. Cl.
CPC ............ *G06F 3/0619* (2013.01); *G06F 3/065* (2013.01); *G06F 3/0631* (2013.01); *G06F 3/0647* (2013.01); *G06F 3/0685* (2013.01); *G06F 11/00* (2013.01); *G06F 12/0246* (2013.01); *G06F 12/10* (2013.01); *G06F 11/073* (2013.01); *G06F 11/0772* (2013.01); *G06F 11/1428* (2013.01); *G06F 11/1441* (2013.01); *G06F 2212/65* (2013.01); *G06F 2212/7204* (2013.01); *G06F 2212/7211* (2013.01)

(58) Field of Classification Search
CPC .... G06F 3/0619; G06F 3/0631; G06F 3/0647; G06F 3/0685; G06F 12/10; G06F 2212/65; G06F 12/0246; G06F 11/00; G06F 3/065; G06F 2212/7211; G06F 2212/7204; G06F 11/1441; G06F 11/073; G06F 11/1428; G06F 11/0772
See application file for complete search history.

(56) References Cited

U.S. PATENT DOCUMENTS

| 8,010,764 B2 * | 8/2011 | Keller, Jr. ............. G06F 1/3225 |
| | | 711/165 |
| 2010/0202240 A1 * | 8/2010 | Moshayedi .............. G11C 5/04 |
| | | 711/103 |

(Continued)

*Primary Examiner* — Masud K Khan
(74) *Attorney, Agent, or Firm* — Jackson Walker L.L.P.

(57) ABSTRACT

In accordance with embodiments of the present disclosure, an information handling system may include a processor and a memory system communicatively coupled to the processor. The memory system may include one or more persistent memory modules, each of the one or more persistent memory modules comprising a volatile memory and a non-volatile memory and one or more health registers accessible to a host system executing on the processor, the health registers storing health information indicating, for each of a plurality of ranks of the volatile memory, whether the memory system can reliably perform a save operation to a portion of non-volatile memory mapped to volatile memory of the rank.

20 Claims, 2 Drawing Sheets

(51) Int. Cl.
*G06F 11/14* (2006.01)
*G06F 11/07* (2006.01)

(56) References Cited

U.S. PATENT DOCUMENTS

| | | | |
|---|---|---|---|
| 2013/0031298 A1* | 1/2013 | Tan | G06F 12/0246 |
| | | | 711/103 |
| 2015/0177995 A1* | 6/2015 | Camp | G06F 11/10 |
| | | | 711/103 |
| 2016/0110124 A1* | 4/2016 | Camp | G06F 3/0619 |
| | | | 714/704 |
| 2016/0139989 A1* | 5/2016 | Muralimanohar | G06F 11/1012 |
| | | | 714/764 |
| 2016/0224267 A1* | 8/2016 | Yang | G06F 3/0631 |
| 2018/0067666 A1* | 3/2018 | d'Abreu | G06F 3/0619 |

* cited by examiner

SYSTEMS AND METHODS FOR GRANULAR NON-VOLATILE MEMORY HEALTH VISIBILITY TO A HOST

TECHNICAL FIELD

The present disclosure relates in general to information handling systems, and more particularly to systems and methods for providing granular non-volatile memory health visibility to a host.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs), including NVDIMM-N. An NVDIMM is a memory module that may retain data even when electrical power is removed either from an unexpected power loss, system crash or from a normal system shutdown. To enable such functionality, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a "save" operation to transfer data from the DRAM to the flash memory in response to a power loss event from the power supply unit.

In typical DRAM-only implementations of memory systems, no DRAM health is made visible to a host system, as DRAMs are assumed to have almost infinite endurance. However, on NVDIMM-N modules, where the non-volatile media (e.g., flash) operates in the background for guaranteeing persistence on a power loss and is unexposed to the host system, there is a single health bit that is used to warn the user on the media health on the whole. This bit informs the host memory controller (e.g., executing within a processor) that the media accessed has exceeded a given user-configurable percentage of the maximum accesses allowed (e.g., 70 percent). Such health bit represents the entire media of an DIMM (or NVDIMM) module as it assumes the entire volatile media (e.g., DRAM) storage space is mapped to non-volatile media (e.g., flash memory) in a save operation during a power loss. However, in actuality, there may exist specific portions of the non-volatile media (e.g., blocks or ranks) that can have different failure rates due to any number of factors, including shrinking process geometries, process variations, etc. Accordingly, it may be desirable to provide fine-grained media health visibility to a host system.

SUMMARY

In accordance with the teachings of the present disclosure, the disadvantages and problems associated with determining health of a non-volatile memory module in an information handling system may be reduced or eliminated.

In accordance with embodiments of the present disclosure, an information handling system may include a processor and a memory system communicatively coupled to the processor. The memory system may include one or more persistent memory modules, each of the one or more persistent memory modules comprising a volatile memory and a non-volatile memory and one or more health registers accessible to a host system executing on the processor, the health registers storing health information indicating, for each of a plurality of ranks of the volatile memory, whether the memory system can reliably perform a save operation to a portion of non-volatile memory mapped to volatile memory of the rank.

In accordance with these and other embodiments of the present disclosure, a method may include, in a memory system comprising one or more persistent memory modules, each of the one or more persistent memory modules comprising a volatile memory and a non-volatile memory, storing health information in one or more health registers of a memory system, the health information indicating, for each of a plurality of ranks of the volatile memory, whether the memory system can reliably perform a save operation to a portion of non-volatile memory mapped to volatile memory of the rank, such that the health information is accessible to a host system executing on a processor communicatively coupled to the memory system.

In accordance with these and other embodiments of the present disclosure, a memory system may include one or more persistent memory modules, each of the one or more persistent memory modules comprising a volatile memory and a non-volatile memory and one or more health registers accessible to a host system executing on the processor, the health registers storing health information indicating, for each of a plurality of ranks of the volatile memory, whether the memory system can reliably perform a save operation to a portion of non-volatile memory mapped to volatile memory of the rank.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
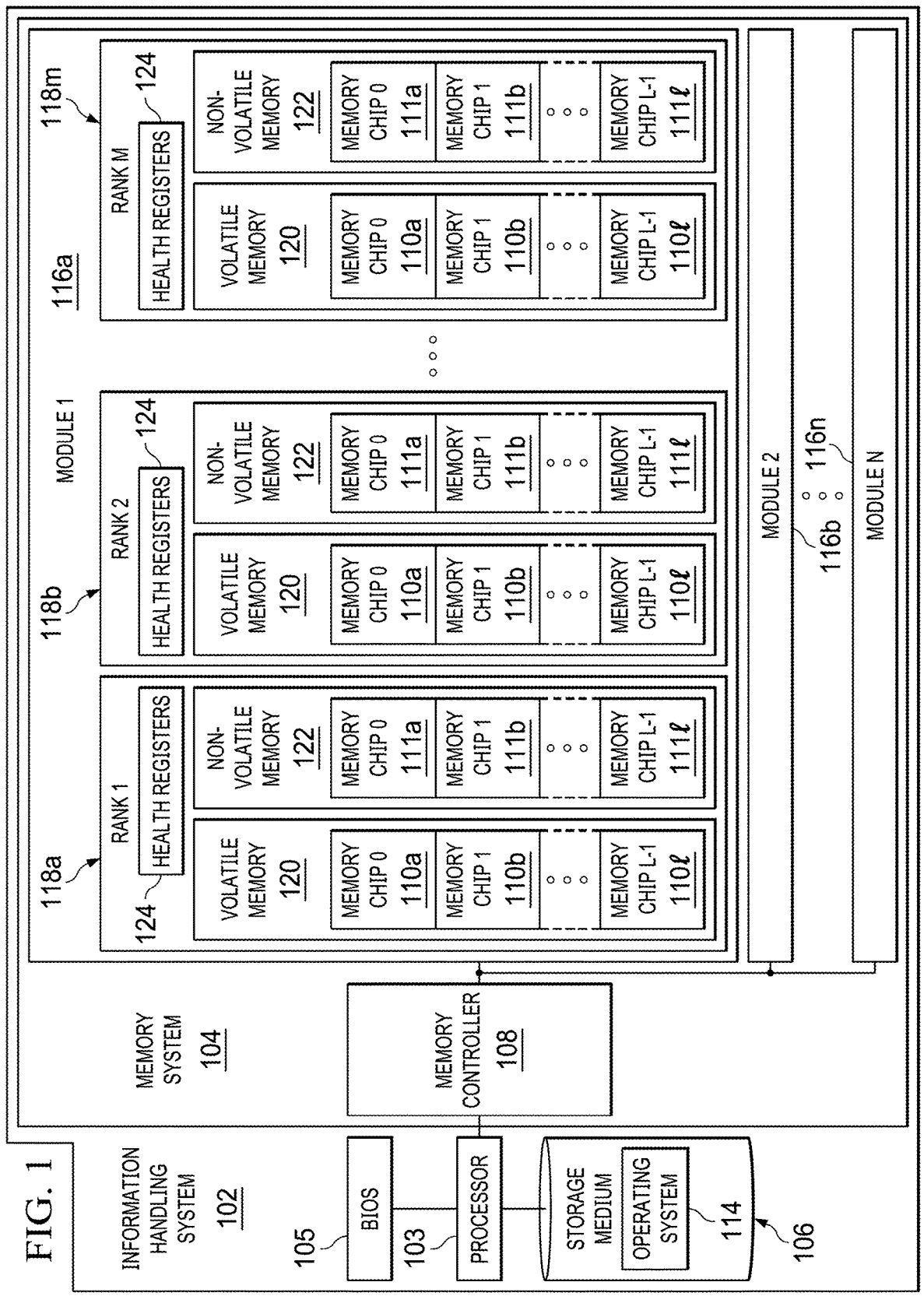
FIG. 1 illustrates a block diagram of an example information handling system in accordance with embodiments of the present disclosure.
Figure 2:
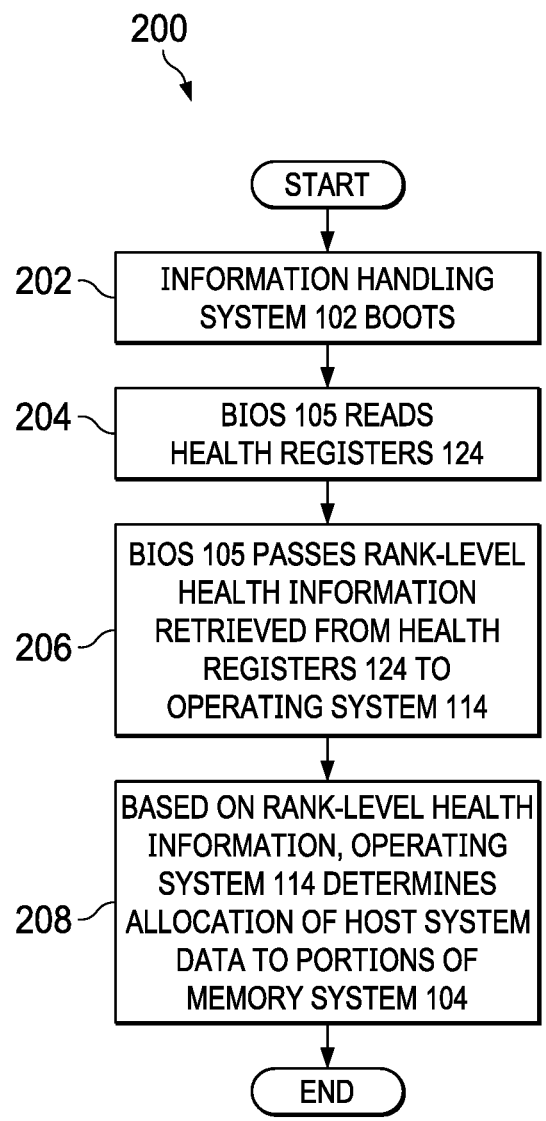
FIG. 2 illustrates a flow chart of an example method for host system usage of information in memory rank-level health registers, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102 in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in FIG. 1, information handling system 102 may include a processor 103, a memory system 104 communicatively coupled to processor 103, a basic input/output system (BIOS) 105 communicatively coupled to processor 103, and a storage medium 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, BIOS 105, storage medium 106, and/or another component of information handling system 102.

Memory system 104 may be communicatively coupled to processor 103 and may comprise any system, device, or apparatus operable to retain program instructions or data for a period of time (e.g., computer-readable media). Memory system 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory system 104 may comprise a persistent memory (e.g., comprising one or more NVDIMMs) that includes volatile memory (e.g., DRAM or other volatile random-access memory) and non-volatile memory (e.g., flash memory or other non-volatile memory), as described in greater detail below.

As shown in FIG. 1, memory system 104 may include memory controller 108 and one or more memory modules 116a-116n communicatively coupled to memory controller 108. Memory controller 108 may be any system, device, or apparatus configured to manage and/or control memory system 104. For example, memory controller 108 may be configured to read data from and/or write data to memory modules 116 comprising memory system 104. Additionally or alternatively, memory controller 108 may be configured to refresh memory modules 116 and/or memory chips 110 thereof in embodiments in which memory system 104 (or a portion thereof) comprises DRAM. Although memory controller 108 is shown in FIG. 1 as an integral component of memory system 104, memory controller 108 may be separate from memory system 104 and/or may be an integral portion of another component of information handling system 102 (e.g., memory controller 108 may be integrated into processor 103).

Each memory module 116 may include any system, device or apparatus configured to retain program instructions and/or data for a period of time (e.g., computer-readable media). As shown in FIG. 1, a memory module 116 may comprise a persistent memory (e.g., NVDIMM) comprising volatile memory 120 and non-volatile memory 122. In particular embodiments, memory module 116 may comprise an NVDIMM-N implementation, in which volatile memory 120 and non-volatile memory exist on the same memory module 116, and memory module 116 may present only volatile memory 120 to OS 114, and any save operations are performed invisibly to OS 114 in the event of a power loss. As depicted in FIG. 1, each memory module 116 may include one or more ranks 118a-118m. Each memory rank 118 within a memory module 116 may be a block or area of data created using some or all of the memory capacity of the memory module 116. In some embodiments, each rank 118 may be a rank as such term is defined by the JEDEC Standard for memory devices.

As shown in FIG. 1, each rank 118 may include a volatile memory 120 and an associated non-volatile memory 122. Each rank-level volatile memory 120 may include a plurality of memory chips 110, and each rank-level non-volatile memory 122 may include a plurality of memory chips 111. Each memory chip 110 may include a packaged integrated circuit configured to comprise a plurality of volatile memory cells for storing data. In some embodiments, a memory chip 110 may include dynamic random access memory (DRAM). Each memory chip 111 may include a packaged integrated circuit configured to comprise a plurality of non-volatile memory cells for storing data. In some embodiments, a memory chip 111 may include flash memory.

During normal operation, when an electrical power source provides adequate power to components of information handling system 102, data written to memory 104 from processor 103 may be stored in volatile memory 120. However, in the event of loss of system input power or a power fault that prevents delivery of electrical energy from the power source to memory 104, data stored in volatile memory 120 may be transferred to non-volatile memory 122 in a save operation. After input power is restored, or a faulty power source is replaced, such that the power source is again operable to provide electrical energy to information handling resources of information handling system 102, on the subsequent power-on of information handling system 102, data may be copied from non-volatile memory 122 back to volatile memory 120 via a restore operation. The combined actions of data save and then data restore, allow the data to remain persistent through a power disruption. Accordingly, although not explicitly shown in FIG. 1, memory 104 may also include hardware, firmware, and/or software for carrying out save operations.

As shown in FIG. 1, each rank 118 may include one on more rank-level health registers 124. Health registers may comprise non-volatile computer-readable media. Health registers 124 may be configured to, for the rank 118 they are implemented within or associated with, set forth rank-level health information related to volatile memory 120 of the rank 118. In particular, the health information for a particular rank 118 will signify whether volatile memory 120 for the rank will reliability perform a save operation to healthy non-volatile memory 122 mapped to volatile memory 120 of the rank 118. For example, in some embodiments, health registers 124 may include information regarding correctable restore errors as data is read from memory media. In some of such embodiments, such restore errors may be assigned a severity (e.g., low, medium, high) based on set criteria. In these and other embodiments, health registers 124 may include information regarding the usage of media within the rank 118. In these and other embodiments, health registers 124 may include rank-level runtime updates regarding media health based on diagnostic tests performed by BIOS 105 and/or memory controller 108.

Although FIG. 1 depicts each rank 118 including its own set of health registers 124 integral thereto, in some embodiments, health registers 124 may be implemented within memory controller 108, such that memory controller 108 includes a plurality of rank-level health registers for memory system 104.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Storage medium 106 may be communicatively coupled to processor 104. Storage medium 106 may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114. OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

In addition to processor 103, memory system 104, BIOS 105, and storage medium 106, information handling system 102 may include one or more other information handling resources.

During operation, processor 103 as well as BIOS 105 and OS 114 may comprise a host system of information handling system 102. In operation of the host system, rank-level health registers 124 may provide granular health information to the host system, so that the host system may use and/or allocate memory of memory system 104 responsive to the health information. An example method for using information stored in health registers 124 is depicted in FIG. 2.

For example, during boot or runtime of information handling system 102, BIOS 105 may read the various health registers 124 as pass information stored in the various health registers to OS 114.

FIG. 2 illustrates a flow chart of an example method 200 for host system usage of information in memory rank-level health registers, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, information handling system 102 may boot, leading to initialization of BIOS 105. At step 204, BIOS 105 may read health registers 124. At step 206, BIOS 105 may pass rank-level health information retrieved from health registers 124 to OS 114. Although this paragraph contemplates boot-time reading of health information, in some embodiments, health information may be retrieved on a regular or periodic basis during OS 114 runtime. In addition, although discussion within this disclosure sets forth particular mechanisms for communicating rank-level health information, in general, the aggregate of health information communicated from memory system 104 to OS 114 is such that the health information for a particular rank 118 will signify whether volatile memory 120 for the rank will reliability perform a save operation to healthy non-volatile memory 122 mapped to volatile memory 120 of the rank 114. Thus, in systems that do not support wear-leveling of non-volatile memory 122, volatile memory 120 may be mapped to non-volatile memory 122 in a one-to-one fashion, and determination of potentially unreliable portions of volatile memory 120 may be easily determined. However, in systems supporting wear-leveling of non-volatile memory 122, memory controller 108 and/or OS 114 may require a bit more sophistication in the reporting and/or analysis of health information, such that a host system executing on OS 114 may identify regions of volatile memory 120 mapped to problematic regions of non-volatile memory 122, especially where non-volatile memory 122 has run out of memory space for wear leveling.

At step 208, based on such rank-level health information, OS 114 may determine allocation of host system data to portions of memory system 104. For example, based on such rank-level health information, OS 114 may determine mappings of virtual memory addresses to physical memory addresses of memory system 104, so as to ensure critical data is written to healthier ranks 118 of memory system 104 while less critical data is written to less healthier ranks 118 of memory system 104. After step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using processor 103, BIOS 105, OS 114, and/or any other system operable to implement method 200. In certain embodiments, method 200 may be implemented partially or fully in software and/or firmware embodied in computer-readable media.

In addition to use by a host system of information in rank-level health registers 124 in allocating memory, the host system may also use information of health registers 124 to perform debugging and/or diagnostics tests of the various ranks 118 within memory system 104.

Using the methods and systems disclosed herein, having rank-based or fine-grained media health visibility allows a host system to do away avoid allocating critical data to potentially problematic corresponding volatile memory address blocks or ranks, including the case of one-to-one mappings of volatile memory to non-volatile memory and other mappings that may exist due to wear leveling.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a memory system communicatively coupled to the processor, the memory system comprising:
one or more persistent memory modules, each of the one or more persistent memory modules comprising a volatile memory and a non-volatile memory; and
one or more health registers accessible to a host system executing on the processor, the one or more health registers configured to store health information indicating, separately for each of a plurality of ranks of the volatile memory and at a rank-level granularity, whether the memory system can reliably perform a save operation to a portion of non-volatile memory mapped to volatile memory of the rank;
wherein each rank comprises a respective Joint Electron Device Engineering Council (JEDEC) rank of the volatile memory.

2. The information handling system of claim 1, wherein the health information includes information regarding correctable restore errors.

3. The information handling system of claim 2, wherein the health information includes a severity for each correctable restore error.

4. The information handling system of claim 1, wherein the health information includes information regarding the usage of the volatile memory or the non-volatile memory within each rank.

5. The information handling system of claim 1, wherein the health information includes runtime updates regarding memory media health based on diagnostic tests.

6. The information handling system of claim 1, wherein the host system executing on the processor is further configured to:
read rank-level health information from the one or more health registers; and
allocate data to physical addresses of the memory system based on the rank-level health information.

7. The information handling system of claim 6, wherein allocating data to physical addresses comprises mapping of virtual memory addresses to physical memory addresses based on the health information.

8. A method comprising, in a memory system comprising one or more persistent memory modules, each of the one or more persistent memory modules comprising a volatile memory and a non-volatile memory:
- storing health information in one or more health registers of a memory system, the health information indicating, separately for each of a plurality of ranks of the volatile memory and at a rank-level granularity, whether the memory system can reliably perform a save operation to a portion of non-volatile memory mapped to volatile memory of the rank, such that the health information is accessible to a host system executing on a processor communicatively coupled to the memory system;
- wherein each rank comprises a respective Joint Electron Device Engineering Council (JEDEC) rank of the volatile memory.

9. The method of claim 8, wherein the health information includes information regarding correctable restore errors.

10. The method of claim 9, wherein the health information includes a severity for each correctable restore error.

11. The method of claim 8, wherein the health information includes information regarding the usage of the volatile memory or the non-volatile memory within each rank.

12. The method of claim 8, wherein the health information includes runtime updates regarding memory media health based on diagnostic tests.

13. The method of claim 8, further comprising, by the host system executing on the processor communicatively coupled to the memory system:
- reading rank-level health information from the one or more health registers; and
- allocating data to physical addresses of the memory system based on the rank-level health information.

14. The method of claim 13, wherein allocating data to physical addresses comprises mapping of virtual memory addresses to physical memory addresses based on the health information.

15. A memory system comprising:
- one or more persistent memory modules, each of the one or more persistent memory modules comprising a volatile memory and a non-volatile memory; and
- one or more health registers accessible to a host system, the one or more health registers configured to store health information indicating, separately for each of a plurality of ranks of the volatile memory and at a rank-level granularity, whether the memory system can reliably perform a save operation to a portion of non-volatile memory mapped to volatile memory of the rank;
- wherein each rank comprises a respective Joint Electron Device Engineering Council (JEDEC) rank of the volatile memory.

16. The memory system of claim 15, wherein the health information includes information regarding correctable restore errors.

17. The memory system of claim 16, wherein the health information includes a severity for each correctable restore error.

18. The memory system of claim 15, wherein the health information includes information regarding the usage of the volatile memory or the non-volatile memory within the rank.

19. The memory system of claim 15, wherein the health information includes runtime updates regarding memory media health based on diagnostic tests.

20. The memory system of claim 15, wherein the host system is further configured to:
- read rank-level health information from the one or more health registers; and
- allocate data to physical addresses of the memory system based on the rank-level health information.

* * * * *